March 12, 1929.  T. F. CULLINAN  1,704,883
BRACKET
Filed Feb. 5, 1925
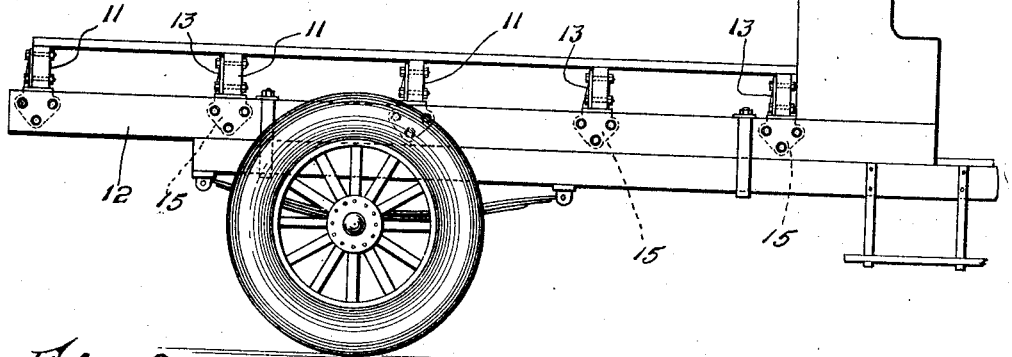
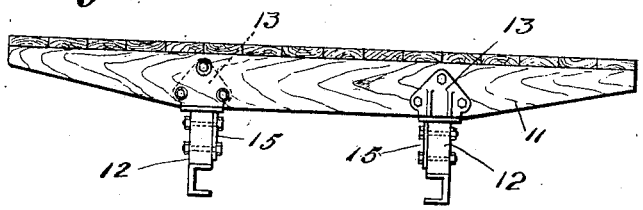
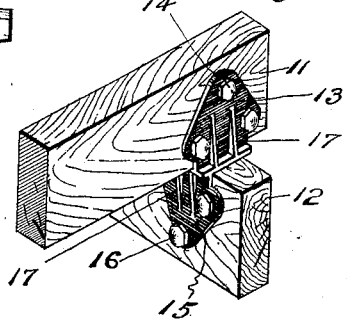
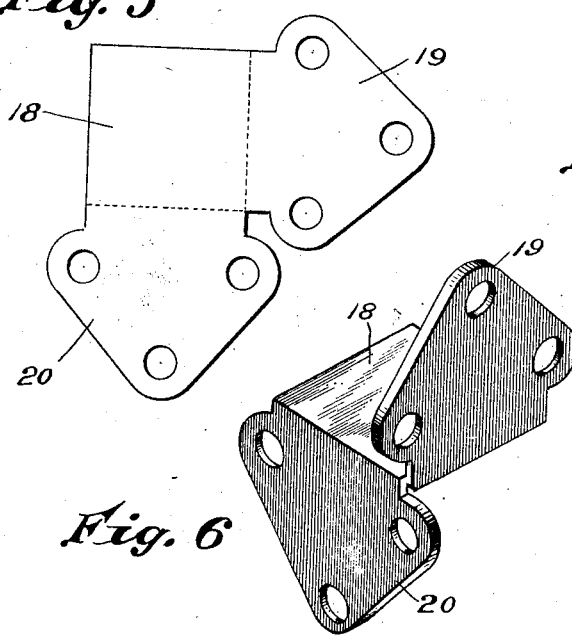
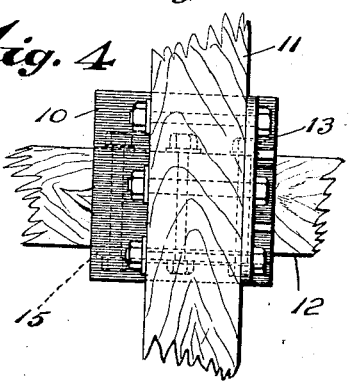
INVENTOR.
Thomas F. Cullinan.
BY Barlow + Barlow
ATTORNEYS.

Patented Mar. 12, 1929.

1,704,883

UNITED STATES PATENT OFFICE.

THOMAS F. CULLINAN, OF PROVIDENCE, RHODE ISLAND.

BRACKET.

Application filed February 3, 1925. Serial No. 6,557.

This invention relates to an improved construction of bracket for fastening beams together at their intersection; and the object of this invention is to provide such a bracket adapted to be more particularly used on the heavier type of motor vehicles for the purpose of securing the wooden bolster beam to the wooden chassis sill at their points of intersection, to provide a strong joint between these beams to hold them against relative movement and resist the constant strains and wearing action due to bearing heavy loads while traveling over rough pavements.

A further object of this invention is to form the bracket with a bearing plate adapted to be positioned between the beams at their intersection, the plate being of an area greater than that of the area of the beams one upon the other, to provide an extended bearing surface therefor, and so reduce the wearing effect at their greatest wearing point.

A still further object of this invention is to provide this intermediate bearing plate with oppositely extending side bearing plates disposed in planes at right angles to each other and adapted to engage and be bolted to the side faces of the two intersecting beams.

With these and other objects in view, the invention consists of certain novel features of construction, as will be more fully described, and particularly pointed out in the appended claim.

In the accompanying drawings:

Figure 1 is a side elevation illustrating a portion of a motor vehicle of the truck-type and illustrating my improved bracket as arranged to connect the bolster with the chassis sills at their points of intersection.

Figure 2 is an end view of a portion of the chassis of the vehicle showing the ends of the beams forming the chassis sills and the bolster as secured by my improved bracket to these sill beams, also showing the floor of the truck.

Figure 3 is an enlarged perspective view illustrating one of my improved brackets as connecting the two beams together at their points of intersection.

Figure 4 is a top view illustrating the extended area of the bearing plate which is positioned intermediate the beams at their points of crossing.

Figure 5 is a modification illustrating a blank as cut from sheet stock from which my improved bracket may be formed.

Figure 6 shows a sheet metal blank as folded into a finished form having a bearing plate with two oppositely extending side-bearing flanges set in planes at right angles to each other and at right angles to said plate.

It is found in the practical construction of frames for motor vehicles such as those employed in heavy trucks and the like, where the bolster or cross beams rest upon the longitudinally-disposed beams or chassis sills and are bolted thereto, that constant vibration of the vehicle parts serves to wear these beams where one rests upon the other and to soon destroy the same. Then again, where an ordinary fastening bolt is passed vertically through both of the beams this bolt soon becomes loosened and the stock taken out by the bolt hole still further weakens the beams at this vital point and assists to further loosen the extent of the wearing life of the beams. To obviate this difficulty, I have provided a bracket having a bearing plate interposed between the two beams, the same providing an extended bearing area thereby greatly prolonging the wearing life of the beams at this point. Then again, instead of passing a fastening bolt down through the beams, I provide side-bearing flanges adapted to extend along the face on each of the beams and to permit bolting through the sides of the beams, by which construction the operating or wearing life of the same is greatly extended; and the following is a detailed description of the present embodiment of my invention showing one means by which these advantageous results may be obtained:—

With reference to the drawings, 10 designates a bearing plate which is adapted to be positioned between intersecting surfaces of the beams 11 and 12. This plate is provided with an extending bearing surface much greater than the normal contacting area of the beams when resting one upon the other. This plate is provided on one edge with an upwardly-extending side-bearing flange 13 adapted to engage the side faces of the beam 11 and is secured thereto by means of bolts 14. This bearing plate is also provided with a downwardly-extending side bearing flange 15 on another edge thereof which is set in a plane at right angles to the flange 13 and is adapted to be positioned against the side face of beam 12 and is secured thereto by means of bolts 16. In some instances, these brackets may be formed of a casting in which case supporting ribs 17 may be employed, while in other cases I form these brackets of sheet metal; first being blanked out into substantially the form illustrated in Figure 5, having a bearing plate 18 with a flanged portion 19 on one edge and a flanged portion 20 on another edge thereof. The flange portion 19 is bent upwardly while the flange 20 is bent downwardly from the edges of this plate thereby setting these flanges 19 and 20 in planes at right angles to each other and each at a right angle to the plane of the bearing plate 18, by which construction when applied to the chassis beams of a vehicle the upwardly-extending flange 13 of the bracket, sets against the outside surface of the bolster 11, while the flange 13 on the left end engages the opposite side of the bolster 11 thus it will be seen that this bolster is engaged and supported from opposite sides at its opposite ends to receive maximum support against tipping in either direction from its normal vertical plane. Then again, it will be seen that by forming the flange members a little less than the depth or width of the beams they engage, the whole weight of the load is supported on the bearing plate, the fastening bolts passing through these flanges simply serving to bind the flanges to the sides of the beams to hold them firmly in their normal operating position.

My improved bracket is very simple and practical in construction, is inexpensive to manufacture, is very effective in its operation, and also when this bracket is formed of sheet stock it may be made very light in weight and yet be strong and durable and well adapted to support the beams in their operating positions at their points of intersection, one with the other.

The foregoing description is directed solely towards the construction illustrated, but I desire it to be understood that I reserve the privilege of resorting to all the mechanical changes to which the device is susceptible, the invention being defined and limited only by the terms of the appended claim.

I claim:

A bracket for fastening wooden beams together at their intersection, comprising a unitary bearing plate having an area greater than the normal bearing area between said intersecting beams, two flanges extending from said bearing plate in opposite directions, the flanges being disposed in different planes at substantially right angles to each other and each at right angles to the plane of the said plate, and each flange having means permitting rigid securing of said beams thereto.

In testimony whereof I affix my signature.

THOMAS F. CULLINAN.